United States Patent
Takazane

(10) Patent No.: US 9,583,909 B2
(45) Date of Patent: Feb. 28, 2017

(54) TEMPERATURE CONTROLLABLE GAS LASER OSCILLATOR

(71) Applicant: FANUC CORPORATION, Minamitsuru-gun, Yamanashi (JP)

(72) Inventor: Tetsuhisa Takazane, Yamanashi (JP)

(73) Assignee: Fanuc Corporation, Tamanashi (JP)

( * ) Notice: Subject to any disclaimer, the term of this patent is extended or adjusted under 35 U.S.C. 154(b) by 0 days.

(21) Appl. No.: 15/053,152

(22) Filed: Feb. 25, 2016

(65) Prior Publication Data
US 2016/0254635 A1    Sep. 1, 2016

(30) Foreign Application Priority Data

Feb. 27, 2015   (JP) .................................. 2015-039131

(51) Int. Cl.
| | |
|---|---|
| H01S 3/04 | (2006.01) |
| H01S 3/041 | (2006.01) |
| H01S 3/00 | (2006.01) |
| H01S 3/104 | (2006.01) |
| H01S 3/223 | (2006.01) |
| H01S 3/03 | (2006.01) |
| H01S 3/036 | (2006.01) |

(52) U.S. Cl.
CPC .......... *H01S 3/0407* (2013.01); *H01S 3/0014* (2013.01); *H01S 3/041* (2013.01); *H01S 3/104* (2013.01); *H01S 3/03* (2013.01); *H01S 3/036* (2013.01); *H01S 3/0401* (2013.01); *H01S 3/2232* (2013.01)

(58) Field of Classification Search
CPC .. H01S 5/02469; H01S 5/02407; H01S 5/024; H01S 3/041; H01S 3/0014; H01S 3/0407; H01S 3/04; H01S 3/00

USPC ................................................ 372/34, 35, 36
See application file for complete search history.

(56) References Cited

U.S. PATENT DOCUMENTS

| | | | | |
|---|---|---|---|---|
| 2007/0268944 A1 * | 11/2007 | Voss | ........................ | H01S 3/036 |
| | | | | 372/34 |
| 2015/0244138 A1 * | 8/2015 | Honda | .................. | H01S 3/0323 |
| | | | | 372/38.05 |

FOREIGN PATENT DOCUMENTS

| | | | | |
|---|---|---|---|---|
| JP | H01-232779 A | | 9/1989 | |
| JP | 2001-024257 A | | 1/2001 | |
| JP | 2001-057452 | * | 2/2001 | ............. H01S 3/041 |
| JP | 2001-057452 A | | 2/2001 | |
| JP | 2009-117700 | * | 2/2009 | ............... H01S 3/03 |
| JP | 2009-117700 | | 5/2009 | |

* cited by examiner

*Primary Examiner* — Tuan Nguyen
(74) *Attorney, Agent, or Firm* — RatnerPrestia

(57) ABSTRACT

A gas laser oscillator according to the present invention comprises a resonator unit, a heat exchanger through which a fluid exchanging heat with a laser gas flows, a chiller for cooling the fluid in the heat exchanger and supplying the fluid to the heat exchanger, and a heat transfer device for transferring heat of the fluid to the resonator unit. The gas laser oscillator further comprises a first flow path for supplying the fluid used for cooling the laser gas in the heat exchanger to the heat transfer device, a second flow path for supplying the fluid cooled by the chiller to the heat transfer device prior to supplying the fluid to the heat exchanger, and a switching valve for switching either one of a first flow path and a second flow path.

7 Claims, 3 Drawing Sheets

TEMPERATURE CONTROLLABLE GAS LASER OSCILLATOR

BACKGROUND OF THE INVENTION

1. Field of the Invention

The present invention relates to a gas laser oscillator adopting a method for cooling a laser gas by a heat exchanger, in particular, a gas laser oscillator capable of controlling a temperature of a resonator unit.

2. Description of the Related Art

Laser processing machines have been known which perform machining, such as cutting and punching, by irradiating metal and resin materials with laser beams. Such laser processing machines are often equipped with carbon dioxide laser oscillators which can generate large output.

A carbon dioxide laser oscillator comprises a resonator unit which excites a gas mixture (hereinafter, referred to as a laser gas) mainly consisting of carbon dioxide, nitrogen, and helium and resonates a beam generated from the excited laser gas to amplify the beam. The resonator unit includes a discharge tube for storing the laser gas and a total reflection mirror and a partial reflection mirror (an output coupler) disposed on both ends in a long axis direction of the discharge tube. When the laser gas in the discharge tube is excited by a discharge, a beam is generated in the long axis direction of the discharge tube. The generated beam is amplified by being repeatedly reflected between the total reflection mirror and the partial reflection mirror (the output coupler) and output to the outside of the resonator unit by transmitting through the output coupler.

When the laser gas in the discharge tube is excited by a discharge to generate a laser beam, 10% or more of a discharge energy applied to the laser gas is converted to the beam. Remaining discharge energy generates heat and increases a temperature of the laser gas. Accordingly, a temperature of the resonator unit is increased which may deform components constituting the resonator unit. Thus, in the gas laser oscillator, the laser gas of which temperature becomes high is drained out from the discharge tube, cooled by a heat exchanger, and returned into the discharge tube. In addition, cooling water is circulated through the heat exchanger and controlled at a constant temperature by a cooling device, such as a chiller, on the outside of the laser oscillator. Temperature increase of the laser gas is thus suppressed, so that the components constituting the resonator unit are less likely to be deformed, and a laser output can be stable.

In particular, the output coupler and the total reflection mirror which are the components constituting the resonator unit are positioned with high accuracy, and the temperature control of the resonator unit is an important technique for stabilizing the laser output. Thus, many techniques have been discussed for controlling temperatures of resonator units.

Japanese Laid-open Patent Publication No. 2001-57452 discloses a gas laser oscillator which comprises a flow path for circulating a cooling medium in an optical bench holding reflection mirrors of a resonator and an electromagnetic valve for opening and closing the flow path. The gas laser oscillator measures a temperature of the cooling medium flowing through the optical bench by a temperature sensor and opens and closes the electromagnetic valve depending on a measured value. Accordingly, temperature increase of the cooling medium is suppressed, and a temperature of the resonator unit is maintained within a predetermined temperature range.

Japanese Laid-open Patent Publication No. H01-232779 discloses a gas laser oscillator including a mirror cooling system for circulating cooling water around mirrors of a resonator unit, a heat exchanger for cooling a laser medium, and a laser medium cooling system for circulating the cooling water through the heat exchanger. The gas laser oscillator further comprises piping connecting the laser medium cooling system and the mirror cooling system and an electromagnetic valve for opening and closing the piping. When the temperature of the cooling water in the mirror cooling system is lower than a predetermined temperature, the electromagnetic valve is closed. When the temperature of the cooling water in the mirror cooling system is higher than the predetermined temperature, the electromagnetic valve is opened, and a part of the cooling water circulating through the heat exchanger of the laser medium cooling system is supplied to the mirror cooling system.

Japanese Laid-open Patent Publication No. 2001-24257 discloses a method for equalizing temperature distribution of a resonator unit by circulating water controlled at a constant temperature spirally around the resonator unit.

Japanese Laid-open Patent Publication No. 2009-117700 discloses a gas laser oscillator including a gas flow path for sealing a laser gas in the gas laser oscillator and a heat exchanger for cooling the laser gas in the gas flow path. The gas laser oscillator further comprises, in the gas flow path, a gas detour for detouring around the heat exchanger and a gas flow rate regulating valve for regulating a flow rate of the laser gas flowing through the gas detour. The gas flow rate regulating valve regulates the flow rate of the laser gas passing through the heat exchanger, and thus the temperature of the laser gas is controlled.

The above-described resonator unit resonates the laser beam by positioning the respective reflection mirrors to be disposed on the both ends of the discharge tube with high accuracy. Therefore, if a position of each reflection mirror is shifted, an operation of the carbon dioxide laser oscillator may become unstable, such as occurrence of reduction of a laser output.

In a positioning operation of each reflection mirror, the carbon dioxide laser oscillator is operated while adjusting the position of each reflection mirror, and each reflection mirror is fixed at a position at which a predetermined output is stably oscillated, namely a position at which a steady state is obtained. In other words, each reflection mirror is placed on a position at which the resonator unit obtains a temperature distribution of the steady state. Thus, immediately after a start-up of the carbon dioxide laser oscillator, the temperature distribution of the resonator unit is different from the temperature distribution in the steady state in some cases. In this case, the position of each reflection mirror may be shifted from the position in the steady state, and the operation of the carbon dioxide laser oscillator may be unstable. In particular, when the carbon dioxide laser oscillator is used in a cold region or in a winter season, a problem notably occurs that an operation of the carbon dioxide laser oscillator immediately after a start-up becomes unstable.

As a countermeasure against the above-described problem, the temperature of the resonator unit is increased by starting up the carbon dioxide laser oscillator and performing a gas discharge in the discharge tube for a certain period of time. When the temperature distribution of the resonator unit becomes that in the steady state, it is regarded that preparation for laser oscillation is complete, and laser oscillation from the resonator unit is permitted. However, such a countermeasure has a problem that it takes a time from the start-up of the carbon dioxide laser oscillator to the completion of the laser oscillation preparation.

In addition, the carbon dioxide laser oscillator is designed to radiate heat generated by the resonator unit to the outside. Specifically, when the carbon dioxide laser oscillator is started up, cooling water controlled at a constant temperature by the chiller is circulated through the heat exchanger so as to cool the laser gas by the heat exchanger. Therefore, when the carbon dioxide laser oscillator is started up from a cold state, the laser gas is cooled, and it hinders the temperature increase of the resonator unit by contrast. Accordingly, there is also a problem that a period from the start-up of the carbon dioxide laser oscillator to when an oscillation operation can be stably performed becomes longer.

Any of Japanese Laid-open Patent Publications No. 2001-57452, No. H01-232779, No. 2001-24257 and No. 2009-117700 disclose only techniques for cooling the resonator units including the laser gas and the reflection mirrors so that temperatures of the resonator units do not exceed predetermined temperatures. In other words, the gas laser oscillators described in Japanese Laid-open Patent Publications No. 2001-57452, No. H01-232779, No. 2001-24257, and No. 2009-117700 only perform control to suppress temperature increase of the resonator units after start-up of the gas laser oscillators. Therefore, these techniques have problem that they take times from the start-up of the gas laser oscillators to when oscillation operations can be stably performed when the gas laser oscillators are used in cold regions or in winter seasons.

SUMMARY OF THE INVENTION

The present invention is directed to the provision of a gas laser oscillator capable of completing oscillation preparation as quickly as possible after start-up of the gas laser oscillator, in case that the gas laser oscillator is used in a cold region or in a winter season.

According to a first aspect of the present invention, a gas laser oscillator is provided which comprises a resonator unit including a discharge unit for exciting a laser gas by a discharge, the resonator unit being configured to oscillate a laser beam generated by excitation of the laser gas, a heat exchanger configured to flow a fluid therethrough to exchange heat with the laser gas, a chiller configured to suction the fluid in the heat exchanger, cool the fluid, and supply the fluid into the heat exchanger, and a heat transfer device configured to transfer heat of the fluid to the resonator unit, and wherein the gas laser oscillator further comprises a first flow path configured to supply the fluid used for cooling the laser gas in the heat exchanger from the heat exchanger to the heat transfer device, a second flow path configured to supply the fluid cooled by the chiller to the heat transfer device prior to supplying the fluid to the heat exchanger, and a switching valve configured to switch either one of the first flow path and the second flow path.

According to a second aspect of the present invention, there is provided the gas laser oscillator according to the first aspect which further comprises a regulating valve configured to regulate a flow rate of the fluid, which is cooled by the chiller, to be supplied to the heat exchanger.

According to a third aspect of the present invention, there is provided the gas laser oscillator according to the second aspect, wherein the resonator unit includes an oscillation prevention device configured to prevent oscillation of the laser beam.

According to a fourth aspect of the present invention, there is provided the gas laser oscillator according to any of the first aspect to the third aspect which further comprises a temperature sensor configured to measure a temperature of the resonator unit and a control device configured to compare a measurement temperature measured by the temperature sensor with a predetermined temperature, the control device controlling the switching valve on the basis of the comparison result.

According to a fifth aspect of the present invention, there is provided the gas laser oscillator according to the third aspect which further comprises a temperature sensor configured to measure a temperature of the resonator unit and; a control device configured to compare a measurement temperature measured by the temperature sensor with a predetermined temperature, the control device controlling the switching valve and at least one of the regulating valve and the oscillation prevention device on the basis of the comparison result.

According to a sixth aspect of the present invention, there is provided the gas laser oscillator according to any of the first aspect to the fifth aspect, wherein the heat transfer device includes a radiator configured to flow the fluid from either one of the first flow path and the second flow path therethrough and a fan configured to send heat of the radiator to the resonator unit.

According to a seventh aspect of the present invention, there is provided the gas laser oscillator according to any of the first aspect to the sixth aspect, wherein the heat transfer device includes a flow path configured to flow the fluid from either one of the first flow path and the second flow path therethrough, and the flow path is formed in the resonator unit.

Further purposes, features, and advantages of the present invention and others will become apparent from the following detailed descriptions of exemplary embodiments with reference to the attached drawings.

DETAILED DESCRIPTION

Figure 1:
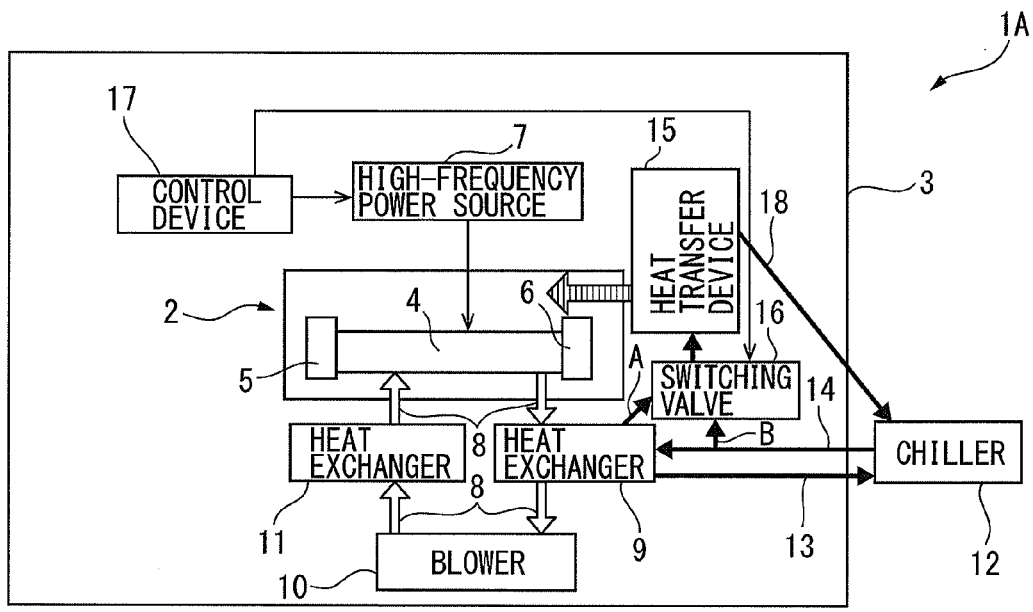
FIG. 1 is a block diagram illustrating a schematic configuration of a gas laser oscillator according to a first embodiment.

Various embodiments of the present invention are described below with reference to the drawings. The same reference numerals are used for the same members throughout the drawings. Scales of the drawings have been appropriately changed to facilitate understanding of the present invention. A fast axial flow type gas laser apparatus is described as an example of a gas laser oscillator, however, the present invention is not limited to the fast axial flow gas laser.

First Embodiment

FIG. 1 is a block diagram illustrating a schematic configuration of a gas laser oscillator according to a first embodiment.

A gas laser oscillator 1A according to the present embodiment comprises a resonator unit 2 for resonating a laser beam to be output in a housing 3.

The resonator unit 2 stores a laser gas, i.e. a gas mixture consisting of, for example, carbon dioxide, nitrogen, and helium and comprises an axial type discharge unit 4 for exciting the laser gas by discharging to emit a laser beam. The axial type discharge unit is formed in such a manner that, for example, four discharge tubes (not illustrated) are connected in series and disposed in the housing 3 by folding the four discharge tubes (not illustrated) in units of two tubes. The total number of the discharge tubes and the number of units of the discharge tubes to be folded are not limited to the above-mentioned numbers.

An output coupler (a partial reflection mirror) 5 and a total reflection mirror 6 are respectively disposed on positions in an optical axis direction of both ends of the discharge unit 4. A folding mirror (not illustrated) is disposed on an intermediate position of the discharge unit 4. These mirrors are positioned with high accuracy and supported by a supporting component (not illustrated).

A high-frequency power source 7 is disposed on the outside of the discharge unit 4. The high-frequency power source 7 applies high-frequency electricity to electrodes (not illustrated) in the discharge unit 4 to discharge the laser gas between the electrodes. When the laser gas is excited by a discharge, a laser beam is emitted in the longitudinal direction of the discharge unit 4. The laser beam is amplified by being repeatedly reflected between the output coupler 5 and the total reflection mirror 6 and output to the outside of the resonator unit 2 by transmitting through the output coupler 5. The output laser beam is used for metal processing, resin processing, and the like.

In the housing 3, a laser gas flow path 8 is provided for circulating the laser gas in the discharge unit 4. The laser gas flow path 8 is a flow path from one end of the discharge unit 4 to another end of the discharge unit 4 via a first heat exchanger 9, a blower 10, and a second heat exchanger 11 in order. In FIG. 1, the laser gas flow path 8 is illustrated by outlined arrows to facilitate understanding of flow directions of the laser gas.

The blower 10 is operated on the laser gas flow path 8, so that the laser gas in the discharge unit 4 is vented to the outside of the discharge unit 4 and cooled by the first heat exchanger 9. The laser gas passing through the first heat exchanger 9 is supplied to the discharge unit 4 by the blower 10. The laser gas is compressed when passing through the blower 10 and a temperature of the laser gas is increased. Thus, the laser gas passing through the blower 10 is cooled by the second heat exchanger 11. Thus, the temperature increase of the laser gas in the discharge unit 4 is suppressed by the above-described configuration.

On the outside of the housing 3, a cooling water temperature control device, such as a chiller 12, for controlling a temperature of the cooling water in the first heat exchanger 9 is provided. The chiller 12 suctions a cooling fluid, for example, cooling water, used for cooling the laser gas in the first heat exchanger 9 to a first cooling water flow path 13. Further, the chiller 12 adjusts the temperature of the cooling water at a constant temperature and supplies the cooling water to the first heat exchanger 9 via a second cooling water flow path 14.

The gas laser oscillator 1A further comprises a heat transfer device 15, a switching valve 16, and a control device 17.

The switching valve 16 is, for example, a three-way valve having two inlets and one outlet. One of the two inlets of the switching valve 16 is connected to the first heat exchanger 9 and the other is connected to the second cooling water flow path 14. The outlet of the switching valve 16 is connected to the heat transfer device 15. Thus, the switching valve 16 can switch a cooling water supply path for supplying the cooling water to the heat transfer device 15 between two flow paths A and B. In other words, the cooling water supply path to the heat transfer device 15 can be selected from either one of a first flow path A for supplying the cooling water in the first heat exchanger 9 to the heat transfer device 15 and a second flow path B for supplying the cooling water in the second cooling water flow path 14 to the heat transfer device 15.

The switching valve 16 which can select the above-described two flow paths A and B is controlled by the control device 17. The control device 17 also controls the power of the high-frequency power source 7. The heat transfer device 15 is connected to the chiller 12 by a third cooling water flow path 18. The cooling water in the heat transfer device 15 can be returned to the chiller 12 by the third cooling water flow path 18.

The heat transfer device 15 is a device for transferring heat of the cooling water to the resonator unit 2. When the above-described first flow path A is selected by the switching valve 16 so that the cooling water warmed by cooling the laser gas in the first heat exchanger 9 is supplied to the heat transfer device 15, the heat transfer device 15 functions as a heating device. Whereas, when the above-described second flow path B is selected by the switching valve 16 so that the low temperature cooling water flowing from the chiller 12 to the second cooling water flow path 14 is supplied to the heat transfer device 15, the heat transfer device 15 functions as a cooling device.

Next, operations of the gas laser oscillator 1A and temperature control of the resonator unit 2 are described.

When the gas laser oscillator 1A is started up, the control device 17 controls the power of the high-frequency power source 7 to discharge and excite the laser gas in the discharge unit 4. Accordingly, a part of a laser beam generated by the excited laser gas is output from the output coupler 5 of the resonator unit 2. On the other hand, discharge energy which is not used for the excitation of the laser beam generates heat, and thus the temperature of the laser gas in the discharge unit 4 is increased. The output coupler 5, the total reflection mirror 6, and the folding mirror also absorb a part of the laser beam, and thus these components become heat sources. Consequently, temperature of the entire resonator unit 2 is increased.

In order to suppress the temperature increase of the laser gas in the discharge unit 4, the blower 10 is operated. Accordingly, the laser gas in the discharge unit 4 is vented from one end of the discharge unit 4, i.e. an end unit on which the total reflection mirror 6 is disposed, to the laser gas flow path 8. The laser gas in the laser gas flow path 8 is cooled by the first heat exchanger 9 and the second heat exchanger 11 and supplied to the discharge unit 4 from another end of the discharge unit 4, i.e. an end unit on which the output coupler 5 is disposed. The laser gas thus flows to suppress the temperature increase of the laser gas.

The heat transfer device 15 is also used as the cooling device. Accordingly, the entire resonator unit 2 is cooled, and the components constituting the resonator unit 2, such as the output coupler 5, the total reflection mirror 6, and the folding mirror, are cooled.

When positioning of each reflection mirror used in the resonator unit 2 is performed, the gas laser oscillator 1A is operated as described above, and the heat transfer device 15 is used as the cooling device. It is preferable that the positions of the output coupler 5, the total reflection mirror 6, and the folding mirror are precisely determined when heat generation and cooling of the resonator unit 2 work together and the temperature of the entire resonator unit 2 is in an equilibrium state. Accordingly, the resonator unit 2 is brought into a state in which the resonator unit 2 can stably perform oscillation at a predetermined output, i.e. a steady state.

A laser processing machine may be installed not only a place of which temperature is constant, such as a temperature-controlled chamber but also a place of which temperature changes, for example, an inside of a factory in which a temperature drops, and outdoors. Therefore, in case that the gas laser oscillator 1A is started up in a cold region or in a winter season, the heat transfer device 15 is used as the heating device.

Specifically, when the gas laser oscillator 1A is started up, the laser gas is excited and immediately heated by a discharge and circulated through the laser gas flow path 8 as illustrated in FIG. 1. On this occasion, the laser gas in the discharge unit 4 flows from the one end of the discharge unit 4 on which the output coupler 5 is disposed to the other end of the discharge unit 4 on which the total reflection mirror 6 is disposed. Therefore, when the gas laser oscillator 1A is started up in a cold region or in a winter season, temperatures of the total reflection mirror 6 and its neighboring components are increased faster than other components.

On the other hand, since the other end of the discharge unit 4 on which the output coupler 5 is disposed is supplied with the laser gas cooled by the heat exchangers 9 and 11, temperatures of the output coupler 5 and its neighboring components are difficult to be increased. In addition, since thermal conductivity of quartz glass used as a material of the discharge unit 4 is relatively low, it cannot be expected that the heat of the total reflection mirror 6 is transferred to the output coupler 5 side by the discharge unit 4 itself. Therefore, regarding temperature distribution of the resonator unit 2, a temperature difference between the both ends of the discharge unit 4 becomes larger than that in the above-described steady state. Accordingly, a relative positional relationship of the output coupler 5 and the total reflection mirror 6 is changed, and laser output is reduced than that in the steady state. In addition, an oscillation operation of the laser beam becomes unstable.

Thus, when the gas laser oscillator 1A is started up in a cold region or in a winter season, the heat transfer device 15 is first used as the heating device to warm the entire resonator unit 2. Accordingly, the temperature difference between the both ends of the discharge unit 4 becomes smaller, and the temperature distribution of the resonator unit 2 is shifted to the temperature distribution in the steady state. When the temperature distribution of the resonator unit 2 becomes that in the steady state, the heat transfer device 15 is used as the cooling device.

As described above, when the gas laser oscillator 1A is started up in a cold region or in a winter season, first, the resonator unit 2 is warmed by utilizing the heat of the cooling water in the heat exchanger 9 which has cooled the laser gas. Accordingly, a period from when the gas laser oscillator is started up to when an oscillation operation can be stably performed can be shortened in a cold region or in a winter season.

Regarding the resonator unit 2 according to the present embodiment, the output coupler 5 and the neighboring components are difficult to be warmed. However, if a structure of the resonator unit 2 is changed, a place difficult to be warmed is also changed accordingly in the resonator unit 2. Therefore, in case that the resonator unit 2 is warmed by using the heat transfer device 15 as the heating device, it is preferable that a place in the resonator unit 2 of which temperature is relatively low is warmed based on the temperature distribution of the resonator unit 2.

It is preferable that the heat transfer device 15 can warm or cool one or more components in a plurality of components constituting the resonator unit 2. The plurality of components constituting the resonator unit 2 comprises the discharge unit 4, the output coupler 5, the total reflection mirror 6, supporting components for supporting the respective reflection mirrors, components constituting the laser gas flow path 8, components to be a light path through which the laser beam passes, and others.

Second Embodiment

Figure 2:
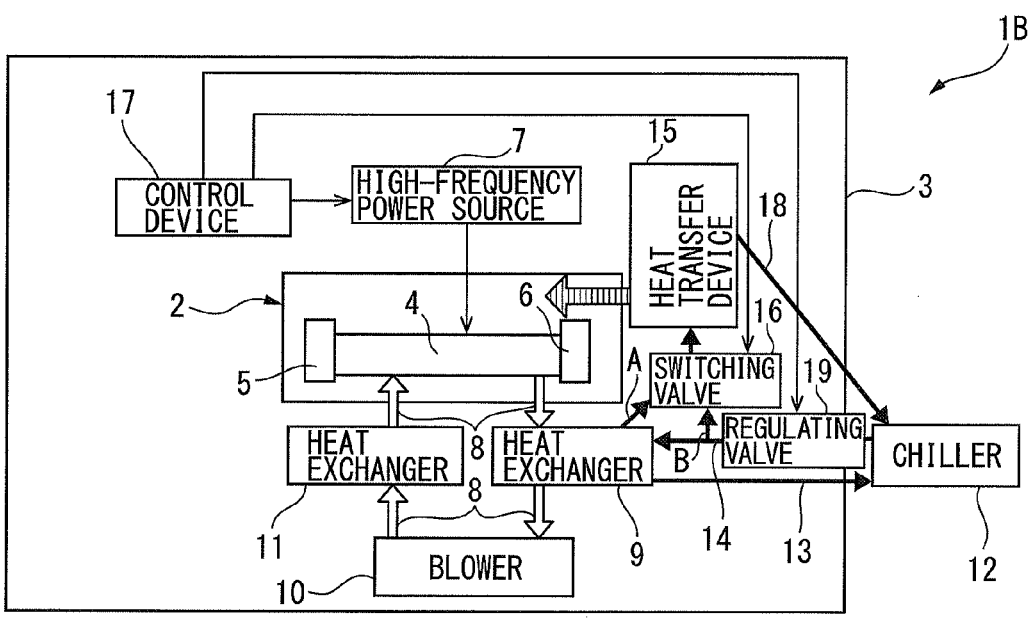
FIG. 2 is a block diagram illustrating a schematic configuration of a gas laser oscillator according to a second embodiment.

FIG. 2 is a block diagram illustrating a schematic configuration of a gas laser oscillator according to a second embodiment. Components the same as those in the first embodiment are denoted by the same reference numerals, and configurations different from the first embodiment are mainly described below.

As illustrated in FIG. 2, a gas laser oscillator 1B according to the second embodiment further comprises a regulating valve 19 with respect to the gas laser oscillator 1A according to the first embodiment. The regulating valve 19 is disposed on the second cooling water flow path 14. The regulating valve 19 can adjust a flow rate of the cooling water supplied from the chiller 12 to the first heat exchanger 9 by changing an opening area of the second cooling water flow path 14. The regulating valve 19 is controlled by the control device 17.

In case that the heat transfer device 15 is used as the cooling device by controlling the switching valve 16, the regulating valve 19 is controlled to increase the flow rate of the low temperature cooling water supplied from the chiller 12 to the first heat exchanger 9. Accordingly, temperature increase of the cooling water in the first heat exchanger 9 is reduced. Therefore, the heat transfer device 15 appropriately functions as the cooling device.

On the other hand, in case that the heat transfer device 15 is used as the heating device by controlling the switching valve 16, the regulating valve 19 is controlled to reduce the flow rate of the cooling water supplied from the chiller 12 to the first heat exchanger 9. Accordingly, the temperature increase of the cooling water in the first heat exchanger 9 is increased. Therefore, the warmed cooling water can be efficiently supplied from the first heat exchanger 9 to the heat transfer device 15.

Third Embodiment

Figure 3:
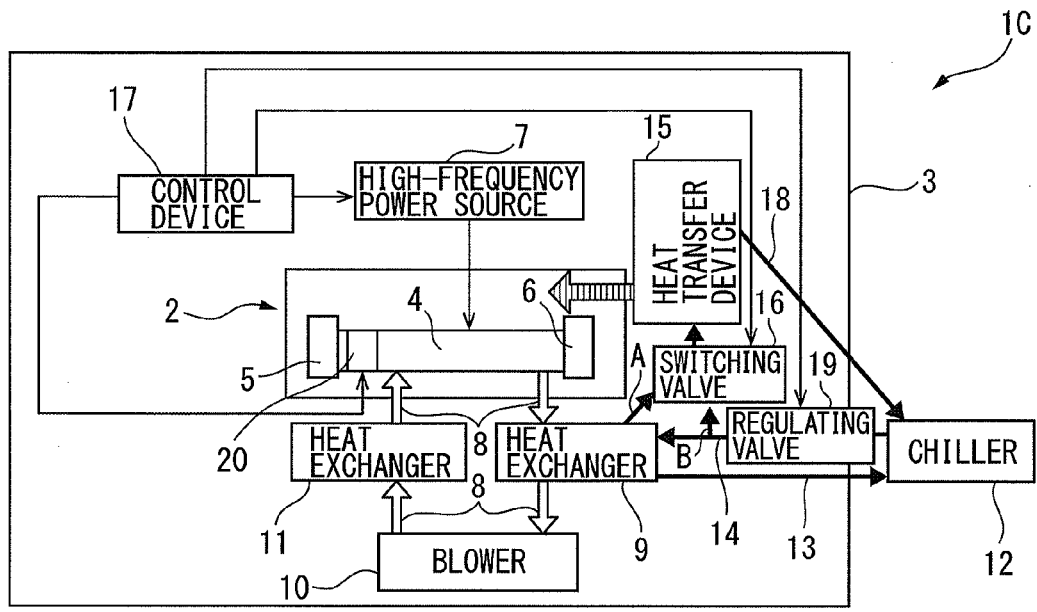
FIG. 3 is a block diagram illustrating a schematic configuration of a gas laser oscillator according to a third embodiment.

FIG. 3 is a block diagram illustrating a schematic configuration of a gas laser oscillator according to a third embodiment. Components the same as those in the first and second embodiments are denoted by the same reference numerals, and configurations different from the first and second embodiments are mainly described below.

As illustrated in FIG. 3, a gas laser oscillator 1C according to the third embodiment further comprises an oscillation prevention device 20 for preventing oscillation of a laser beam with respect to the gas laser oscillator 1B according to the second embodiment. The oscillation prevention device 20 is disposed in the resonator unit 2. As the oscillation prevention device 20, a light shielding plate or the like is used. The control device 17 can control the oscillation prevention device 20.

When the heat transfer device 15 is used as the heating device by controlling the switching valve 16, the oscillation prevention device 20 is enabled by the control device 17. In other words, the oscillation prevention device 20 is controlled to be in a state in which the resonator unit 2 cannot oscillate the laser beam to the outside. Accordingly, the discharge energy for exciting the laser gas in the discharge unit 4 all turns into heat of the laser gas. Thus, as compared to the first and second embodiments, the temperature of the laser gas in the discharge unit 4 is increased, and the cooling water in the first heat exchanger 9 is also increased. Therefore, a heat transfer amount of the heat transfer device 15 can be increased when the temperature of the resonator unit 2 is wanted to be increased by using the heat transfer device 15 as the heating device.

However, if it is desired that the heat transfer device 15 is used as the heating device while the resonator unit 2 outputs the laser beam, for example during laser processing, the oscillation prevention device 20 is disabled by the control device 17. Accordingly, the resonator unit 2 can oscillate the laser beam.

Fourth Embodiment

Figure 4:
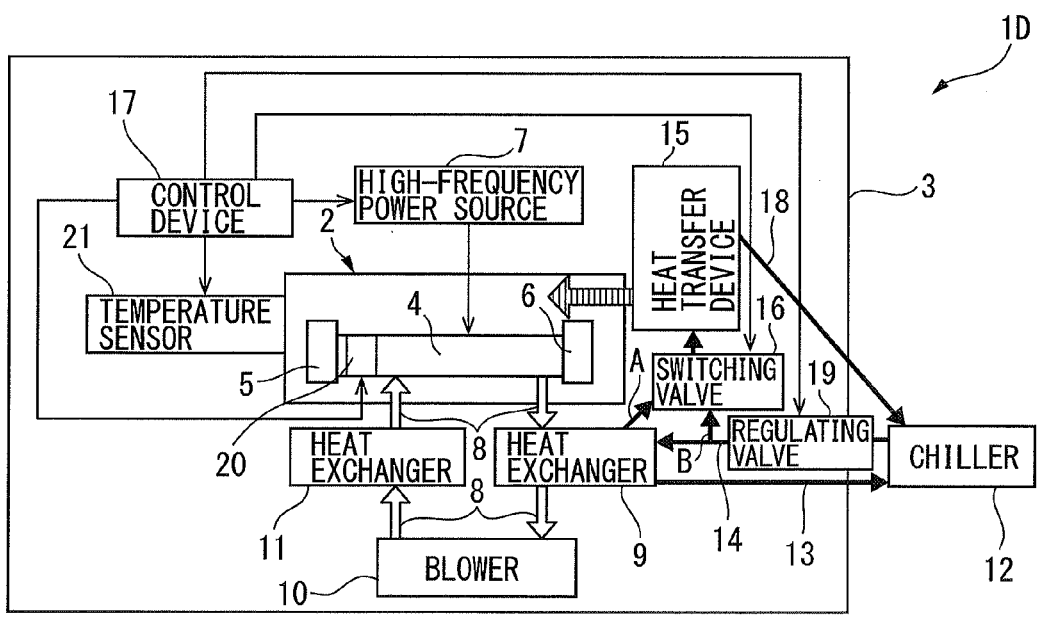
FIG. 4 is a block diagram illustrating a schematic configuration of a gas laser oscillator according to a fourth embodiment.

FIG. 4 is a block diagram illustrating a schematic configuration of a gas laser oscillator according to a fourth embodiment. Components the same as those in the first to third embodiments are denoted by the same reference numerals, and configurations different from the first to third embodiments are mainly described below.

As illustrated in FIG. 4, a gas laser oscillator 1D according to the fourth embodiment further comprises a temperature sensor 21 with respect to the gas laser oscillator 1C according to the third embodiment. The temperature sensor 21 is disposed on the resonator unit 2.

As described above, the laser gas in the discharge unit 4 flows from the one end of the discharge unit 4 on which the output coupler 5 is disposed to the other end of the discharge unit 4 on which the total reflection mirror 6 is disposed. Because the end of the discharge unit 4 on which the output coupler 5 is disposed is supplied with the laser gas cooled by the heat exchangers 9 and 11, the temperatures of the output coupler 5 and the neighboring components are difficult to be increased. Therefore, the output coupler 5 and the neighboring components are components of which temperatures are relatively low in the entire resonator unit 2. Accordingly, the temperature sensor 21 is installed in the vicinity of the output coupler 5 according to the present embodiment. Obviously, an installation place of the temperature sensor 21 is not limited to the vicinity of the output coupler 5, and the temperature sensor 21 may be installed in a place of which temperature is relatively low in the temperature distribution of the resonator unit 2.

The control device 17 compares a measurement temperature measured by the temperature sensor 21 with a setting temperature stored in advance in the control device 17. As a result of comparison, when the measurement temperature is lower than the setting temperature, the control device 17 controls the switching valve 16 to connect the first heat exchanger 9 and the heat transfer device 15. The control device 17 further controls the regulating valve 19 to reduce the opening area of the second cooling water flow path 14 and enables the oscillation prevention device 20 so as to increase the temperature of the cooling water supplied from the first heat exchanger 9 to the heat transfer device 15. Accordingly, the resonator unit 2 can be efficiently warmed by the heat transfer device 15. In addition to the switching valve 16, only one of the regulating valve 19 and the oscillation prevention device 20 may be controlled.

However, it is desired that the heat transfer device 15 is used as the heating device while the resonator unit 2 outputs the laser beam, for example during laser processing, the oscillation prevention device 20 is disabled by the control device 17. Accordingly, the resonator unit 2 can oscillate the laser beam.

When the measurement temperature measured by the temperature sensor 21 is higher than the setting temperature, the control device 17 controls the switching valve 16 to connect the second cooling water flow path 14 and the heat transfer device 15. In other words, the cooling water cooled by the chiller 12 is supplied to the heat transfer device 15. The control device 17 further controls the regulating valve 19 to increase the opening area of the second cooling water flow path 14 and disables the oscillation prevention device 20. Accordingly, because the temperature of the cooling water in the first heat exchanger 9 is lowered, the heat transfer device 15 can efficiently cool the resonator unit 2. In addition to the switching valve 16, only one of the regulating valve 19 and the oscillation prevention device 20 may be controlled.

Fifth Embodiment

Figure 5:
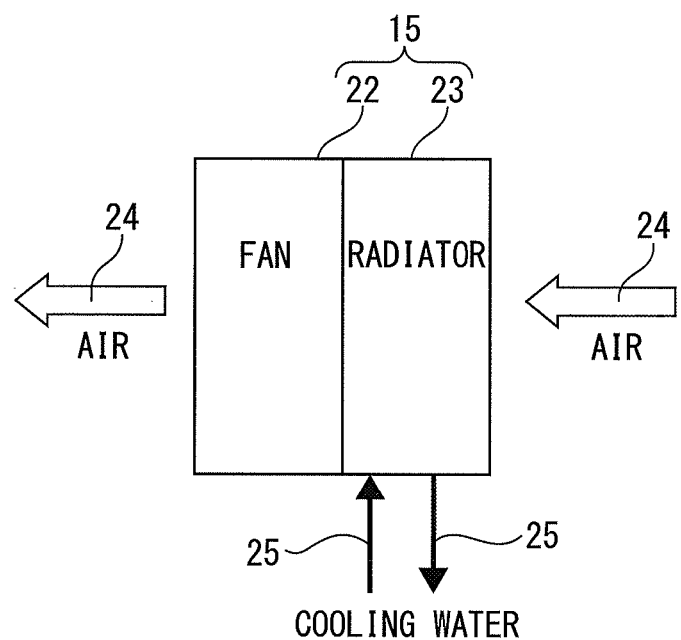
FIG. 5 is a block diagram illustrating a schematic configuration of a gas laser oscillator according to a fifth embodiment.

FIG. 5 is a block diagram illustrating a schematic configuration of a gas laser oscillator according to a fifth embodiment. Components the same as those in the first to fourth embodiments are denoted by the same reference numerals, and configurations different from the first to fourth embodiments are mainly described below.

According to the first to fourth embodiments, the heat transfer device 15 includes a fan 22 and a radiator 23 as illustrated in FIG. 5. The fan 22 has two side surfaces facing to each other and sucks air 24 from one of the two side surfaces and blows the air 24 from another one of the two side surfaces. The radiator 23 is disposed adjacent to one of the two side surfaces of the fan 22.

The radiator 23 is supplied with cooling water 25, and heat is exchanged between the cooling water 25 and the air 24 passing through the radiator 23. In case that the high temperature cooling water 25 is supplied to the radiator 23, since the high temperature air 24 is blown around the resonator unit 2, the entire resonator unit 2 is warmed. In case that the low temperature cooling water 25 is supplied to the radiator 23, since the low temperature air 24 is blown around the resonator unit 2, the entire resonator unit 2 is cooled. The high temperature cooling water supplied to the radiator 23 is the cooling water from the first flow path A described in the first to fourth embodiments. The low temperature cooling water supplied to the radiator 23 is the cooling water from the second flow path B described in the first to fourth embodiments.

It is preferable that the heat transfer device 15 combined with the above-described fan 22 and radiator 23 is disposed in such a manner that the air 24 blown out from the fan 22 passes through the resonator unit 2. Further, a plurality of heat transfer devices 15 may be disposed in the housing 3 so that such air 24 circulates in the housing 3.

Sixth Embodiment

Figure 6:
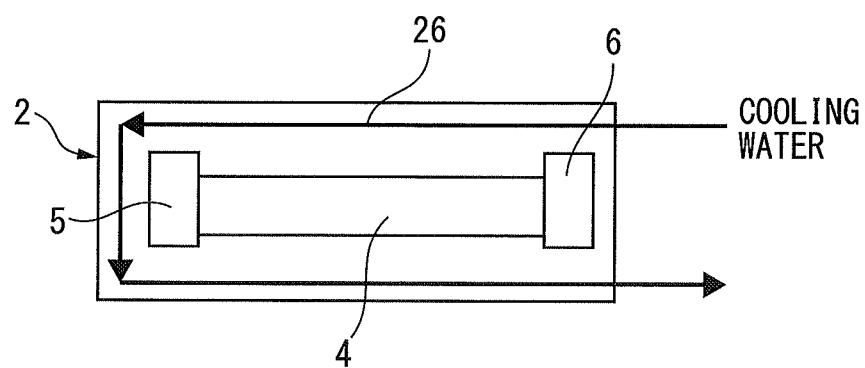
FIG. 6 is a block diagram illustrating a schematic configuration of a gas laser oscillator according to a sixth embodiment.

FIG. 6 is a block diagram illustrating a schematic configuration of a gas laser oscillator according to a sixth embodiment. Components the same as those in the first to fifth embodiments are denoted by the same reference numerals, and configurations different from the first to fifth embodiments are mainly described below.

It is preferable that the resonator unit 2 used in the first to fifth embodiments is provided with a water flow path 26 as illustrated in FIG. 6. In case that the heat transfer device 15 is used as the heating device by controlling the switching valve 16, the resonator unit 2 can be warmed by flowing the high temperature cooling water from the heat transfer device 15 to the water flow path 26. In case that the heat transfer device 15 is used as the cooling device by controlling the switching valve 16, the resonator unit 2 can be cooled by flowing the low temperature cooling water from the heat transfer device 15 to the water flow path 26. The high temperature cooling water flowing into the water flow path 26 is the cooling water from the first flow path A described in the first to fourth embodiments. The low temperature cooling water flowing into the water flow path 26 is the cooling water from the second flow path B described in the first to fourth embodiments.

In particular, in case that there is any place difficult to be warmed in the resonator unit 2, if the water flow path 26 is provided in such a place, the entire resonator unit 2 can be efficiently warmed. In addition, the configuration of the water flow path 26 may be applied to the heat transfer method using a blow as in the fifth embodiment.

The present invention has been described above using the fast axial flow type gas laser apparatus in which the laser gas in the discharge unit 4 flows along an optical axis of the laser beam as an example, however, the gas laser oscillator according to the present invention is not limited to the axial flow type and can be applied to a cross flow type. In other words, the present invention can be applied to a cross flow type gas laser oscillator in which a flow of the laser gas in the discharge unit 4 is perpendicular to the optical axis of the laser beam or the discharge direction.

According to the above-described embodiments, a high-frequency discharge is used for excitation of the laser gas, however, the gas laser oscillator according to the present invention is not limited to the high-frequency discharge and may use a direct current discharge for the excitation.

Effect of the Invention

According to the first aspect of the present invention, when the first flow path is selected by the switching valve, a fluid used for cooling the laser gas in the heat exchanger is supplied from the relevant heat exchanger to the heat transfer device. Thus, the heat transfer device can be used as the heating device of the resonator unit. Therefore, if the first flow path is set by controlling the switching valve when the gas laser oscillator is started up in a cold region or in a winter season, a period from when the gas laser oscillator is started up to when an oscillation operation can be stably performed can be shortened.

On the other hand, when the second flow path is selected by the switching valve, the fluid cooled by the chiller is supplied to the heat transfer device prior to being supplied to the heat exchanger. Thus, the heat transfer device can be used as the cooling device of the resonator unit. Therefore, in case that the gas laser oscillator is started up under a normal environment, for example, in a factory provided with an air conditioner, the second flow path is set by controlling the switching valve. Accordingly, temperature increase of the resonator unit is suppressed, so that the components constituting the resonator unit are less likely to be deformed, and a laser output can be stable.

According to the second aspect of the present invention, a flow rate of a fluid which is cooled by the chiller to be supplied to the heat exchanger can be regulated by using the regulating valve. Thus, in case that the heat transfer device is used as the heating device of the resonator unit, the flow rate of the fluid supplied from the chiller to the heat exchanger is reduced by the regulating valve. Accordingly, a temperature of the fluid in the heat exchanger can be efficiently increased. On the other hand, when the flow rate of the fluid supplied from the chiller to the heat exchanger is increased by the regulating valve, the temperature of the fluid in the heat exchanger can be efficiently lowered. Therefore, the resonator unit can be efficiently warmed and cooled.

According to the third aspect of the present invention, the oscillation prevention device prevents the resonator unit from oscillating the laser beam, and therefore the discharge energy in the resonator unit is all applied to the laser gas as heat. Accordingly, the temperature of the fluid to be used for cooling the laser gas in the heat exchanger can be increased higher than that of when the laser beam is oscillated. Therefore, in case that the heat transfer device is used as the heating device of the resonator unit, the resonator unit can be efficiently warmed.

According to the fourth aspect of the present invention, a temperature of the resonator unit is measured by the temperature sensor, the measurement temperature is compared with a predetermined temperature, and the switching valve is controlled based on the comparison result, so that the resonator unit can be precisely warmed and cooled depending on the temperature of the resonator unit.

According to the fifth aspect of the present invention, the temperature of the resonator unit measured by the temperature sensor is compared with a predetermined temperature, and thus the switching valve and at least one of the regulating valve and the oscillation prevention device can be controlled based on the comparison result. Thus, the regulating valve and the oscillation prevention device can be precisely operated depending on the temperature of the resonator unit.

According to the sixth aspect of the present invention, heat of the radiator is blown by the fan, and thus the resonator unit can be warmed or cooled.

According to the seventh aspect of the present invention, in case that there is a place difficult to be warmed in the resonator unit, a flow path for flowing the fluid in the heat exchanger is provided in such a place, and thus the entire resonator unit can be efficiently warmed.

The exemplary embodiments have been described above, however, the present invention is not limited to the above-described embodiments, and various modifications in forms, configurations, materials, and the like can be made in the above-described embodiments without departing from the spirit of the present invention.

What is claimed is:

1. A gas laser oscillator comprising:
a resonator unit including a discharge unit for exciting a laser gas by a discharge, the resonator unit configured to oscillate a laser beam generated by excitation of the laser gas;
a heat exchanger configured to flow a fluid therethrough to exchange heat with the laser gas;
a chiller configured to suction the fluid in the heat exchanger, cool the fluid, and supply the fluid into the heat exchanger;
a heat transfer device configured to transfer heat of the fluid to the resonator unit;
a first flow path configured to supply the fluid used for cooling the laser gas in the heat exchanger from the heat exchanger to the heat transfer device;
a second flow path configured to supply the fluid cooled by the chiller to the heat transfer device prior to supplying the fluid to the heat exchanger; and
a switching valve configured to switch either one of the first flow path and the second flow path.

2. The gas laser oscillator according to claim 1, further comprising a regulating valve configured to regulate a flow rate of the fluid, which is cooled by the chiller, to be supplied to the heat exchanger.

3. The gas laser oscillator according to claim 2, wherein the resonator unit comprises an oscillation prevention device configured to prevent oscillation of the laser beam.

4. The gas laser oscillator according to claim 3, further comprising:
a temperature sensor configured to measure a temperature of the resonator unit; and
a control device configured to compare a measurement temperature measured by the temperature sensor with a predetermined temperature, the control device controlling the switching valve and at least one of the regulating valve and the oscillation prevention device on the basis of the comparison result.

5. The gas laser oscillator according to claim 1, further comprising:
a temperature sensor configured to measure a temperature of the resonator unit; and
a control device configured to compare a measurement temperature measured by the temperature sensor with a predetermined temperature, the control device controlling the switching valve on the basis of the comparison result.

6. The gas laser oscillator according to claim 1, wherein the heat transfer device comprises a radiator configured to flow the fluid from either one of the first flow path and the second flow path therethrough and a fan configured to send heat of the radiator to the resonator unit.

7. The gas laser oscillator according to claim 1, wherein the heat transfer device comprises a flow path configured to flow the fluid from either one of the first flow path and the second flow path therethrough, and the flow path is formed in the resonator unit.

* * * * *